May 12, 1959     E. J. SCHAEFER     2,886,756
PLUGGING OF SINGLE PHASE MOTORS
Filed Sept. 6, 1957     2 Sheets-Sheet 2
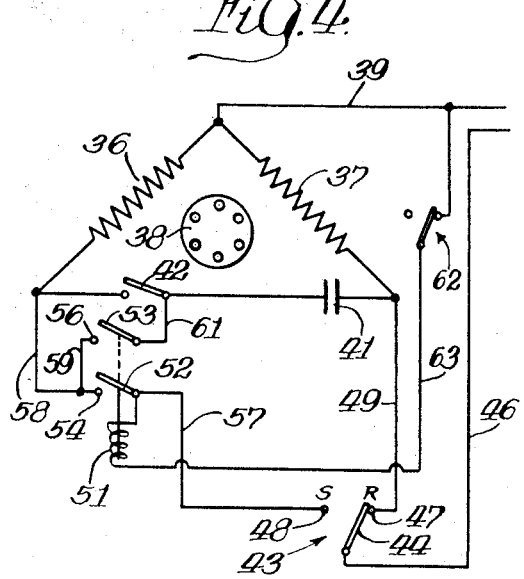
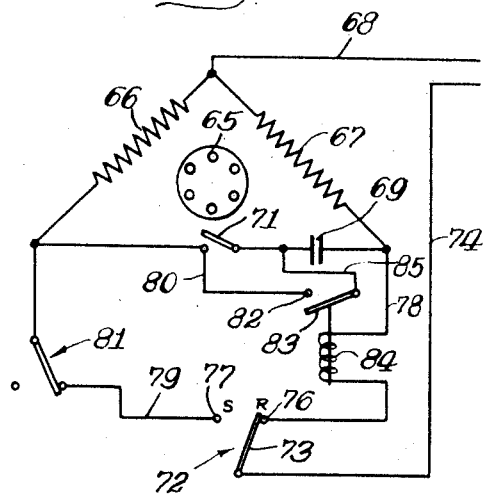
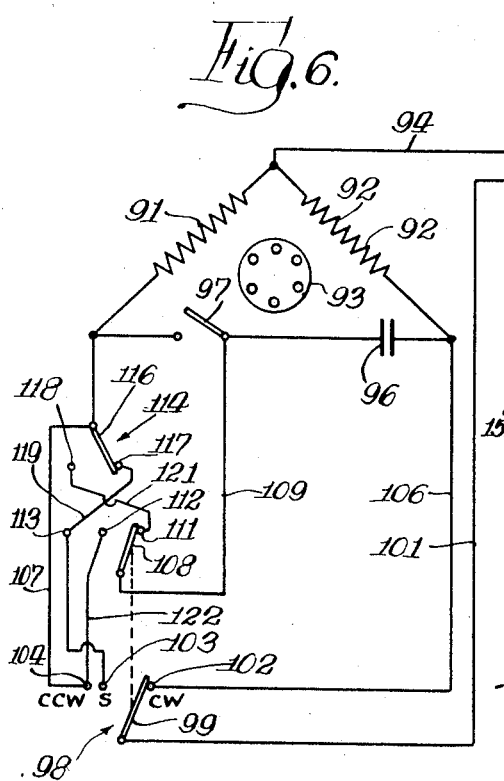
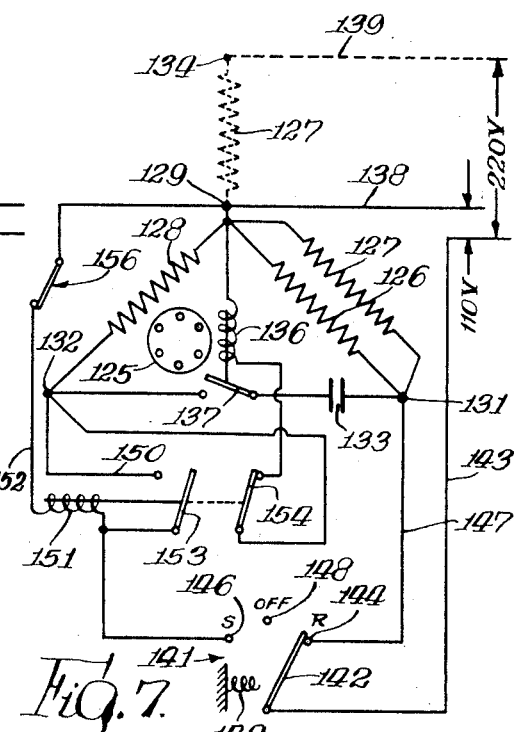
INVENTOR.
Edward J. Schaefer,
BY Davis, Lindsey, Hibben & Noyes
Atty's.

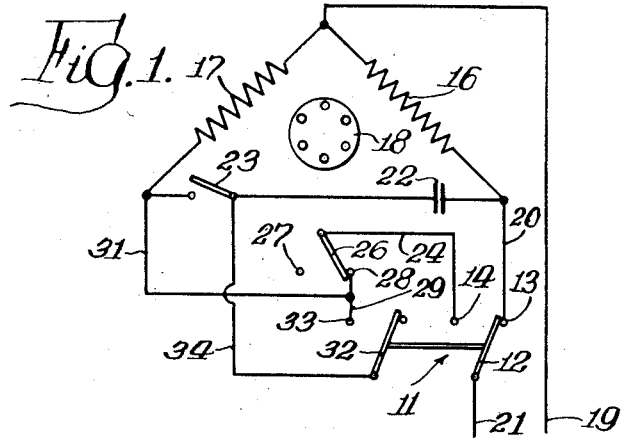
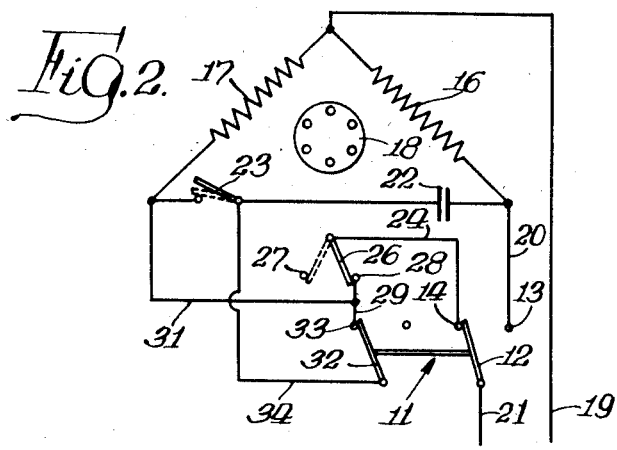
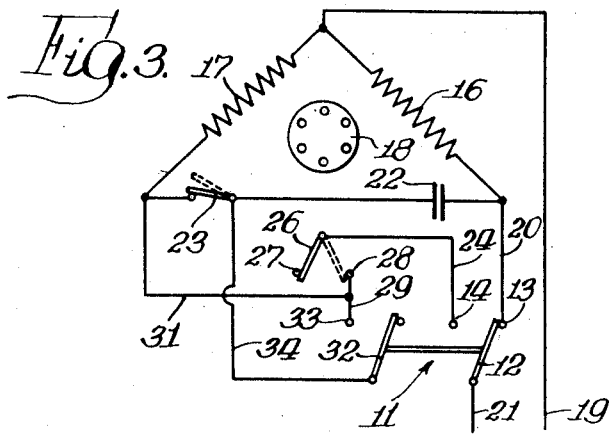

United States Patent Office 2,886,756
Patented May 12, 1959

2,886,756

PLUGGING OF SINGLE PHASE MOTORS

Edward J. Schaefer, Fort Wayne, Ind.

Application September 6, 1957, Serial No. 682,477

18 Claims. (Cl. 318—210)

This application is a continuation-in-part of my copending application, Serial Number 515,961, filed June 16, 1955. now abandoned.

This invention relates to improvements in induction motor controls and more particularly to the plugging of single phase motors.

For many uses of single phase induction motors it is important to provide means for rapidly decelerating the motor and bringing it to rest in a short time. Friction type brake mechanisms and dynamic braking schemes are frequently employed for this purpose. However, for a capacitor start single phase motor of the type having a pair of axially displaced main and auxiliary windings, the method known as plugging is particularly convenient. By means of a manual control switch the main and auxiliary windings are temporarily connected in parallel across the line with the capacitor in series with one of the windings so that a powerful negative or reverse torque is developed compared to the original direction of rotation of the motor. Thus, the motor quickly decelerates, comes to a standstill, and starts in the opposite direction, but at the instant of reversal the power supply is interrupted so that the motor is stopped.

Heretofore, plugged motor circuits have generally involved the use of complex relay and switch arrangements or else they have required a plurality of manipulations by the operator in order to effect complete stopping of the motor. Moreover, plugging of small size motors is frequently difficult with the previously known circuit arrangements because the inertia of the moving parts of the motor is so small that the period of time during which the reverse torque is required to be applied to bring the motor to a complete stop without reversing its direction is often very short. An important advantage of the present invention, as will hereinafter appear, is the extreme simplicity of the scheme both in structure and operation and the further fact that it can be adapted quite easily to any standard single phase motor, including those equipped with the conventional types of devices adapted to disconnect the starting winding when the motor attains running speed.

Accordingly, a primary object of the present invention is to provide novel means for effecting plugged stopping of a single phase motor, which means is simple, inexpensive, and reliable even on small size motors.

A further object of the invention is to provide novel means for plugging a single phase motor which is capable of being installed in any standard single phase motor having a conventional device for disconnecting the starting winding when the motor attains running speed.

Still another object of the invention is to provide a novel simplified plugging system for single phase motors which is operated merely by a single movement of a control switch.

Other objects and advantages of the invention will become evident from the subsequent detailed description taken in conjunction with the accompanying drawings, where:

Figs. 1, 2 and 3 are schematic circuit diagrams showing successive stages in the operation of one specific embodiment of the invention as applied to a single phase motor;

Fig. 4 is a schematic circuit diagram showing another embodiment of the invention adapted specifically for use in single phase motors where high current flow to the motor is expected;

Fig. 5 is a schematic circuit diagram showing still another embodiment of the invention for use with a single phase motor;

Fig. 6 is a schematic circuit diagram showing a further embodiment of the invention as applied to an instantly reversible motor; and Fig. 7 is a schematic circuit diagram showing yet another embodiment of the invention as applied to a dual voltage single phase motor.

Broadly speaking, my invention pertains to a single phase split phase start motor having means for cutting out the starting winding when the motor comes up to speed. A simple manual control switch is used for starting and stopping the motor. Means is provided for instantly effecting the reconnection of the starting winding upon movement of the control switch element from a running position to a stop position so that a reversing circuit connection of the motor windings is instantly obtained to provide the negative torque for stopping the motor. The invention utilizes a rotation sensing switch which is actuated by the motor shaft and arranged to effect complete deenergization of the windings as soon as the motor reverses direction. When the control switch element is again moved to its running position and the motor operated, the rotation sensing switch assumes a position in readiness for the next plugging operation upon the next subsequent movement of the control switch element to its stop position. The invention is applicable not only to motors which normally run in only a single direction but also to reversible motors arranged for operation in either direction.

In order to simplify the description of the invention as much as possible, the various forms of the invention illustrated are shown as applied to motors of the same or similar type. It should be understood, however, that the principles taught herein are equally applicable to other types of single phase motors.

Referring first to Figs. 1 to 3 of the drawing, the invention is illustrated in its simplest form as applied to a common type of single phase capacitor start motor connected to operate in only a single direction. A double pole double throw manual switch 11 is provided in which one of the poles or blades 12 functions as a control switch element and coacts with other control switch elements, namely, a running contact 13 and a stop contact 14. A pair of primary windings 16 and 17, which are alike or substantially alike, are disposed in axially displaced relation in the usual manner, and a rotor 18 of the inductance squirrel cage type is disposed in operative relative adjacent the windings. One of the supply leads, indicated at 19, is connected directly to one end of both of the primary windings 16—17, and the other supply lead 21 is connected to the movable pole or switch blade 12 so that when the switch 11 is in its right-hand or running position the blade 12 engages the contact 13. The contact 13 is, in turn, connected by a conductor 20 to the end of the primary winding 16 opposite its connection with the lead 19 and thus the winding 16 is connected directly across the line as the running winding of the motor.

For split phase starting purposes, a phase splitter, comprising in this case a capacitor 22, is connected between the ends of the primary windings 16 and 17 opposite their connections to the lead 19. Thus, for starting purposes, the starting winding 17 and the capacitor 22 will be connected in parallel circuit with the running winding 16 for providing the desired starting torque.

It is usual to provide single phase split phase start motors with means, such as a centrifugal switch or potential relay, that is adapted to disconnect the starting winding and the phase splitter from the circuit when the motor attains running speed. The present motor is provided with a speed responsive or centrifugal switch 23, connected in series between the capacitor 22 and the starting winding 17. As the motor attains running speed, the centrifugal switch 23 eventually opens and cuts the winding 17 and the capacitor 22 out of circuit.

In order to effect rapid deceleration of the motor by plugging, the phase splitter and the windings must be reconnected to provide a negative torque. With respect to the motor shown in Figs. 1-3, this is accomplished by providing two circuit paths from the switch contact 14 so that when the switch 11 is moved to its left-hand or stop position the winding 17 will instantly be connected directly across the line as a running winding and at the same time the capacitor 22 and the winding 16 will be connected in parallel circuit across the line even though the centrifugal switch 23 is still open. The first circuit path for energizing the winding 17 as a running winding is provided by means of a conductor 24 connecting the stop contact 14 and a single pole single throw rotation responsive or rotation sensing switch element 26 which moves between a stop 27 and a contact 28. The rotation sensing switch contact 28 is in turn connected by conductors 29 and 31 to the primary winding 17. A shunt circuit around the centrifugal switch 23 is provided by means of the remaining switch elements of the switch 11, namely, the pole 32 and a contact 33. The pole 32 engages the contact 33 when the switch 11 is in its left-hand or stop position. The contact 33 is connected by the conductor 29 to the contact 28 of the rotation sensing switch, and the switch blade or pole 32 is connected to the primary winding 16 through the capacitor 22 by means of a conductor 34 which by-passes the centrifugal switch 23. As will readily be understood, the switch blade 32 constitutes, in effect, a shunt switch element for completing the shunt circuit around the centrifugal switch 23 and moves in unison with the control switch element 12 inasmuch as both the elements 32 and 12 are mechanically interlocked as a double throw hand switch.

In Fig. 1, the circuit is shown with the various elements in their respective positions when the motor is running. Thus, the pole 12 of the main switch 11 is closed on the contact 13 so that the primary winding 16 is connected directly across the supply leads 19 and 21 of the line, the winding 16 thereby functioning as the running winding for normal operation of the motor. Inasmuch as the motor is at running speed, the centrifugal switch 23 is open so that the primary winding 17 and the capacitor 22 are disconnected from the line. Moreover, the switch contacts 14 and 33 are open so that the plugging circuits are disrupted.

Assuming now that it is desired to stop the motor, the control switch 11 is moved directly to its opposite position, as seen in Fig. 2, without the necessity of any delay or hesitation whatsoever. The instant the blade 12 of the switch 11 closes on the contact 14, it will be seen that the primary winding 17 is connected directly across the line through the conductor 24, the rotation sensing switch 26, contact 28, and conductors 29 and 31. At the same time, movement of the blade 32 of the switch 11 into engagement with the contact 33 completes a previously established shunt circuit path around the centrifugal switch 23 while the latter is still in the open position indicated in full lines in Fig. 2. Consequently, while the primary winding 17 is now connected directly across the line, the winding 16 now becomes a starting winding and is connected across the line in parallel circuit with the winding 17 through capacitor 22, conductor 34, switch blade 32, contact 33, conductor 29, contact 28, rotation sensing switch element 26, conductor 24, contact 14, and switch blade 12. As thus connected, the motor has a powerful negative or reversing torque tending to decelerate the motor rapidly. As the motor reduces speed, the centrifugal switch 23 eventually closes to the dotted line position of Fig. 2 so that temporarily there is an alternative parallel circuit connection of the winding 16 through the conductor 31, the closed centrifugal switch 23, and the capacitor 22. As the motor decelerates, it eventually comes to a momentary standstill and begins to rotate in the opposite direction under the influence of the negative or reversing torque whereupon the rotation sensing switch element 26 immediately shifts from engagement with the contact 28 to the dotted line position shown in Fig. 2, thereby completely disrupting the connections of the windings 16 and 17 with the supply lead 21 so that the motor is fully deenergized.

Referring next to Fig. 3, when it is desired to resume operation of the motor, the switch 11 is again returned to its right-hand or running position with the blade 12 in engagement with the contact 13 and the blade 32 disengaged from the contact 33. Consequently, as previously described, the winding 16 is connected directly across the line as the running winding, and the winding 17 together with the capacitor 22 are connected across the line in parallel circuit through the centrifugal switch 23 which is in closed position as indicated in full lines in Fig. 3. Of course, the running direction of the motor is opposite to the reverse direction of rotation utilized in effecting plugged stopping of the motor. Consequently, the instant the motor begins to rotate in its normal direction of rotation with the winding 16 as the running winding, the rotation sensing switch element 26 shifts from its full line position into engagement with the contact 28 as shown in dotted lines in Fig. 3. As will be readily apparent, this shifting of the rotation responsive switch 26 establishes or partially sets up the plugging circuits which are adapted to be completed and energized upon the next subsequent movement of the switch 11 to its stop position. As the motor gradually attains running speed, the centrifugal switch 23 eventually opens to its dotted line position as shown in Fig. 3, thereby cutting out the capacitor 22 and the winding 17.

The rotation sensing switches referred to herein, including the switch 26 heretofore described in connection with Figs. 1 to 3, may comprise any one of a number of mechanical structures which will be familiar to those skilled in this art and need not be described in detail. Generally speaking, however, the movable blade of the rotation sensing switch is mounted on the rotor shaft of the motor by means of resilient shoes or the like, having sufficient frictional engagement with the rotor shaft so as to be movable to a limited extent with the rotor shaft as the latter changes direction of rotation. The movable switch blade engages spaced stationary contacts for limiting the extent of movement of the blade and thereafter the rotor shaft of the motor continues to rotate relative to the frictionally engaged mounting means of the switch blade. One suitable mechanical arrangement for purposes of the present invention is shown in my copending application Serial No. 660,850, filed May 22, 1957, wherein the movable blade of the rotation sensing switch is carried by a pair of arcuate shoes of nylon or like material, the shoes being retained in frictional gripping relation on the rotor shaft of the motor by means of a resilient spring extending from and connected to the switch blade.

Current flow to the windings of an electric motor is maximum when the motor is practically stopped, as during stopping and starting. Such current flow through a rotation sensing switch of the type described above may be large enough in larger motors to prevent the switch from opening positively enough for instantaneous action. Furthermore, arcing may burn the contacts of the switch, making the switch less efficient. In Fig. 4 I have illustrated a modification of the invention which avoids these difficulties. In addition, the number of conductors that must be brought out to the manual control switch is reduced as compared to the number in the Fig. 1 form.

The motor shown in Fig. 4 comprises a pair of axially displaced primary windings 36 and 37 and a squirrel cage rotor 38. Both windings are connected at one end to a supply lead 39 adapted to be connected to one side of a line. A capacitor 41 is connected between the ends of the windings opposite their connection with the lead 39, and a speed responsive switch 43 is connected in series with the capacitor 41 for disconnecting it and one of the windings when the motor attains running speed.

Energization of the motor for operation and for plugged stopping is controlled through a manually operated control switch 43. The switch 43 is a single pole double throw switch, having a blade 44 connected to the other side of the supply line by a lead 46. The blade 44 is movable between running and stop positions and coacts respectively with fixed contacts 47 and 48 when in said positions.

The motor is connected for running in one direction by a conductor 49 that interconnects the contact 47 to the end of the winding 37 opposite that connected to the lead 39. Thus, upon engagement of the pole 44 with the contact 47, the winding 37 is connected directly across the line as a running winding and the winding 36 is connected across the line in series with the capacitor 41 and the speed responsive switch 42 as the starting winding to provide the starting torque. When the motor attains running speed, the switch 42 will open and cut out the winding 36 and capacitor 41.

Plugged stopping of the motor is effected in much the same way as in the Figs. 1–3 form, except that a potential relay 51 is introduced into the circuit for the purposes of closing and thereafter opening the preestablished connections that cause the negative torque when the control switch 43 is moved to stop position. The relay 51 is provided with a pair of normally open contactors 52 and 53 which respectively engage fixed contacts 54 and 56 when the relay 51 is energized. A conductor 57 interconnects the contactor 52 and the contact 48 of the control switch, and a conductor 58 interconnects the contact 54 of the relay and the winding 36. Also, a conductor 59 interconnects the fixed contacts 54 and 56, and another conductor 61 connects the contactor 53 to the winding 37 through the capacitor 41. From the foregoing it is seen that when the relay 51 is energized and the switch 43 is in stop position with the blade 44 engaging the contact 48, the winding 36 is connected directly across the line through lead 46, the pole 44, contact 48, conductor 57, contactor 52, contact 54, conductor 58 and the lead 39, and likewise the winding 37 is connected across the line in series with the capacitor 41 to produce the negative torque, through the contactor 52, contact 54, conductor 59, contact 56, contactor 53, conductor 61, and the lead 39.

The relay 51 is connected to be responsive to the positions occupied by both the control switch 43 and a rotation sensing switch 62. The rotation sensing switch 62 is of the same type as that previously described and is closed when the motor rotates in its normal direction. One side of the coil of the relay 51 is connected to the control switch contact 48 by the conductor 57 and the other side of the relay coil is connected by a conductor 63 through the rotation sensing switch 62 to the lead 39, the switch 62 thereby being arranged to deenergize the relay 51 instantly upon reversal of the motor. With these connections it is seen that the relay 51 holds its contactors 52 and 53 closed on their respective contacts 54 and 56 only when the switch 43 is in its stop position and the motor is rotating in the normal direction. As soon as the motor stops and begins to rotate in the reverse direction, the rotation sensing switch 62 opens the circuit through the relay 51 and instantly deenergizing it to disconnect the motor. Thus, the Fig. 4 embodiment operates substantially in the same way as the Fig. 1 embodiment except that the relay 51 carries the burden of actually disconnecting the motor and the rotation sensing switch 62, being in a circuit that is parallel to the motor windings, is not required to open a circuit against a heavy current flow.

Fig. 5 of the drawings illustrates a third form of the invention in which a different type of relay is used to effect the plugging connections. The motor shown has a rotor 65 and a pair of primary windings 66 and 67 connected at one end to one side of a line by a lead 68. A capacitor 69 and a speed responsive switch 71 are connected between the opposite ends of the windings as before. A single pole double throw control switch, shown generally at 72, has its pole 73 connected to the other side of the supply line by a lead 74. The pole 73 is movable between running and stop positions and engages a contact 76 when in the running position and a contact 77 when in the stop position. A conductor 78 interconnects the contact 76 and the winding 67 to provide the running connections. Likewise, a conductor 79 connects the contact 77 through a rotation sensing switch 81 to the winding 66 to provide the plugging connections.

As in the forms previously described, during plugging the speed responsive switch 71 is by-passed upon the closure of a preestablished shunt connection. Unlike the previously described forms, however, in the instant case the shunt is initially closed and is opened when the motor is started. The shunt path includes a fixed contact 82 that is connected to the winding 66 by a conductor 80 and a movable contactor 83 of a relay 84. The contactor 83 is connected by a conductor 85 to the winding 67 through the capacitor 69. The relay 84 is a series relay and the relay coil is interposed in series in the conductor 78. The relay 84 is thus energized when the switch 72 is moved to running position. When energized the relay 84 moves its contactor 83 out of engagement with its contact 82, and thus opens the shunt.

The motor shown in Fig. 5 is started by simply throwing the switch 72 to the running position with the blade 73 engaging the contact 76. This energizes the relay 84, thereby opening the preestablished shunt connection. This also connects the winding 67 directly across the line. In addition, since the speed responsive switch 71 is initially closed, it connects the winding 66 across the line in series with the capacitor 69 to provide the starting torque. When the motor attains running speed the switch 71 opens disconnecting the winding 66 and the capacitor 69.

To stop the motor by plugging, the pole 73 of the control switch 72 is moved from engagement with the contact 76 and into engagement with the contact 77. As soon as the contact 76 is disengaged, the relay 84 is deenergized and the relay contactor 83 instantly moves into engagement with the contact 82 thereby closing the shunt around the speed responsive switch 71. Thereafter, engagement of the pole 73 of the control switch 72 with the contact 77 connects the winding 66, through the conductor 79, the rotation sensing switch 81 and the lead 68, directly across the line and at the same time connects the winding 67 across the line in series with the capacitor 69 through the conductor 80, contact 82, contactor 83, and the conductor 85. A strong negative torque is produced which rapidly decelerates the motor causing the speed responsive switch 71 to close. Thereafter the motor stops and commences to run in the opposite direction. Instantly, however, the rotation sensing switch 81 opens and deenergizes the motor windings.

In many instances it is desirable that motors which are instantly reversible also provide plugged stopping. The motor shown in Fig. 6 is instantly reversible from either direction of operation and it is also arranged for plugged stopping from operation in one direction. A motor of this type is highly useful in connection with certain tools such as power saws, lathes, and the like. The motor shown in Fig. 6 has a pair of primary windings 91 and 92 and a squirrel cage rotor 93, the windings being substantially identical so that each may serve as a running winding. Both windings are connected at one end to a lead 94 adapted to be connected to one side of a line. A capacitor 96 is connected between the ends of the windings opposite the lead 94 and a speed responsive switch 97 is connected in series with the capacitor 96 for disconnecting it and one of the windings when the motor attains running speed in either direction.

Motor operation in this case is controlled by a manual double pole three position switch, shown generally at 98. The switch 98 has one pole 99 connected to a lead 101 and through it to the other side of the line. The switch 98 also has one set of three spaced contacts 102, 103 and 104 that are individually engaged by the pole 99 and designated the clockwise (CW), stop (S), and counterclockwise (CCW) positions, respectively. The CW contact 102 is connected by a conductor 106 to the end of the winding 92 for connecting it directly across the line and also for connecting the winding 91 across the line in series with the capacitor 96 for starting and operating the motor in the clockwise direction. The CCW contact 104 is connected by a conductor 107 to the end of the winding 91 for connecting it directly across the line and for connecting the winding 92 across the line in series with the capacitor 96 for starting and operating the motor in the counterclockwise direction. The S contact 103 is connected to provide plugged stopping if the motor is being operated in one direction and to merely disconnect the motor if it is being operated in the other direction, as will be described more fully hereinafter.

The other pole of the switch 98, designated as 108, is movable in unison with the pole 99, and another set of three spaced contacts 111, 112 and 113 are respectively engaged by the pole 108 as the contacts 102, 103 and 104 are respectively engaged by the pole 99. The pole 108 is connected by a conductor 109 to the winding 92 through the capacitor 96, and in this way provides a common portion of three shunt connections, hereinafter discussed, around the speed responsive switch 97.

Two of the three shunt paths just mentioned are for interconnecting the two windings 91 and 92 through the capacitor 96 and around the speed responsive switch 97 so that the motor may be instantly reversed during running from either direction of operation and without waiting for the speed responsive switch 97 to close. A double throw rotation sensing switch 114 is included in the said two shunt paths to establish one or the other of the shunt paths in readiness for operation, depending on the direction of operation of the motor. The rotation sensing switch 114 has a movable blade 116 that engages spaced fixed contacts 117 and 118. In the present instance the blade 116 engages contact 117 when the motor is operated in the clockwise direction and it engages the contact 118 when the motor is operated in the counterclockwise direction. The blade 116 of the rotation sensing switch is connected to the conductor 107 and, hence, to the end of the winding 91. The contact 117 of the rotation sensing switch 114 is connected to the contact 113 of the control switch 98 and also to the contact 103 thereof by a conductor 119. The contact 118 of the rotation sensing switch 114 is connected to the contact 111 of the control switch 98 by a conductor 121. With these connections it is seen that as soon as the motor begins to operate, one or the other of two shunt paths is set up by the rotation sensing switch for subsequently effecting instant reversing connections of the motor. The shunt path for instantly reversing the motor when it is operating clockwise includes the blade 116 of the rotation sensing switch, contact 117, conductor 119, contact 113, the pole 108 (which will be moved to engage contact 113 to reverse the motor) and the conductor 109. The shunt path for instantly reversing the motor when it is operating counterclockwise includes the blade 116 of the rotation sensing switch, contact 118, conductor 121, contact 111, pole 108 and the conductor 109. Furthermore, one or the other of the above shunts, set up by the rotation sensing switch 114, is immediately disrupted and the other is set up as soon as the motor reverses its direction of rotation. In this connection, the instantly reversing arrangement is similar to that described in my aforementioned copending application Serial No. 660,850, filed May 22, 1957.

The motor shown in Fig. 6 is also connected for plugged stopping, in this instance from the clockwise direction of operation only. For plugged stopping, the contact 117 of the rotation sensing switch and the contact 103 of the control switch 98 are interconnected by the conductor 119 as previously mentioned. Consequently, when the pole 99 engages the S contact 103, it will be seen that the winding 91 is connected directly across the line through the rotation sensing switch 114. In addition a third shunt path is completed around the speed responsive switch and connects the capacitor 96 and winding 92 in series across the line to provide the negative torque. The addition of a conductor 122 connecting the contacts 104 and 112 of the control switch 98, in conjunction with the connections already described, provides this third shunt path which includes the conductor 107, contact 104, conductor 122, contact 112, pole 108 and conductor 109. Since both windings are connected through the rotation sensing switch 114 when the motor is plugged, it will be understood that the entire motor is instantly deenergized as soon as the motor starts to turn in the counterclockwise direction. In this particular instance plugging connections have not been provided for stopping the motor from counterclockwise operation. Instead, when the motor is running counterclockwise, the rotation sensing switch blade 116 is in engagement with the contact 118, and upon movement of the control switch 98 to the stop position, the motor is merely deenergized and allowed to coast to a stop.

To start the motor shown in Fig. 6 from a standstill, in either direction, the manual control switch 98 is merely moved to the proper position. For example, if it is decided to operate the motor in the counterclockwise direction, the switch is moved to the CCW position. This engages the pole 99 with the contact 104 which, through the conductor 107, connects the winding 91 directly across the line. Since the motor is initially stopped, the speed responsive switch 97 is closed and the winding 92 is connected across the line in parallel with the winding 91 and in series with the capacitor 96 to provide the torque for rotating the motor in the counterclockwise direction. As the motor begins to turn counterclockwise, the blade 116 of the rotation sensing switch is moved to the contact 118. When the motor attains running speed, the speed responsive switch 97 opens, disconnecting the winding 92 and the capacitor 96.

Assuming that it is now desired to reverse the direction of motor operation, the switch 98 is simply moved to the CW position. This moves the pole 99 from the contact 104 to the contact 102 and opens the direct connection to the winding 91 while directly connecting the winding 92 across the line. The same action moves the pole 108 from the contact 113 to the contact 111 thereby closing the shunt through the contacts previously set up by the rotation sensing switch 114 and connecting the winding 91 across the line in series with the capacitor. Immediately, a clockwise torque is created. The motor quickly slows down, closing the speed responsive switch 97, which for a period cooperates with the shunt connection to provide alternate connections from the capacitor 96 to the winding 91. Thereafter the motor stops and then begins to rotate in the clockwise direction. Instantly the blade 116 of the rotation sensing switch shifts from the contact 118 to the contact 117 breaking the shunt connection and setting up another shunt connection for the next reversal of the motor. The same action of the rotation sensing switch also sets up the plugging connections for stopping the motor in the event the switch 98 is moved to the stop position. When the motor again attains running speed, the speed responsive switch 97 opens, this time disconnecting the winding 91 and the capacitor 96.

Assuming now that it is desired to quickly stop the motor, the control switch 98 is thrown to the stop position by moving the pole 99 from the contact 102 to the contact 103. Since the motor is turning in the clockwise direction the motor is immediately plugged with the winding 91 being connected across the line through the contact 103, conductor 119, contact 117, blade 116 and the lead 94. Also, the pole 108 is moved from the contact 111 to the contact 112 and completes the plugging shunt, including the conductor 107, the contact 104, the conductor 122, the contact 112, the pole 108 and the conductor 109, that connects the winding 92 across the line in series with the capacitor 96. This creates a strong negative or counterclockwise torque which quickly slows the motor. As the motor slows the speed responsive switch 92 closes. Thereafter, the motor stops and then begins to rotate in the counterclockwise direction. Instantly the blade 116 of the rotation sensing switch 114 shifts from the contact 117 to the contact 118 and completely disconnects the windings to stop the motor.

Fig. 7 shows yet another form of the invention as incorporated in a dual voltage motor. A dual voltage motor is adapted to be connected one way so that it will run on a specified voltage, and is adapted to be connected in another way to run on a different voltage. For the purposes of this description it will be assumed that one of the voltages is 110 volts and that the other is 220 volts. Such motors are often used in connection with portable tools such as table saws, or the like, that are moved from place to place.

In Fig. 7 the motor has a squirrel cage rotor 125 and is provided with a pair of parallel running windings 126 and 127 and an axially displaced starting winding 128. Each winding has one end connected to a common terminal 129. The end of the running winding 126 opposite that connected to the terminal 129 is connected to a terminal 131, and the corresponding end of the starting winding 128 is connected to a terminal 132. Between the terminals 131 and 132 is connected a capacitor 133.

The end of the winding 127 opposite its connection with the terminal 129 is connectable to the terminal 131 so that the two running windings are in parallel for 110 volt operation (this condition being shown by the solid line representation of the winding 127. The same end of the winding 127 is also connectable to the terminal 129 and the end of the winding 127 connected to the terminal 129 for 110 volt operation is connectable to a terminal 134 so that the two running windings are in series for 220 volt operation (this condition being shown by the dotted line representation of the winding 127). A lead 138 interconnects the terminal 129 and one side of a 110 volt supply line when the motor is connected for 110 volt operation. A lead 139 (shown in dotted line) interconnects the terminal 134 and one side of a 220 volt supply line when the motor is connected for 220 volt operation.

The motor also is provided with means for disconnecting the starting winding and capacitor when the motor attains running speed. In this case, however, the disconnecting means comprises a potential relay 136 having a normally closed contactor 137 connected between the capacitor 133 and the terminal 132. The coil of the relay 136 is connected across the starting winding 128, and when the motor attains running speed the relay is sufficiently energized to open its contactor 137 and effect disruption of the starting circuit.

A manual control switch 141 controls the operation and stopping of this motor. The control switch has a single pole 142 connected to a lead 143 that is adapted to be connected to the other side of the supply line. The pole 142 is movable to engage a running contact 144 or a stop contact 146. The running contact 144 is connected by a conductor 147 to the terminal 131 and upon engagement of the pole 142 with the contact 144, the motor is connected across the line for running. Engagement of the pole with the stop contact 146 connects the motor across the line for plugged stopping as will be described in more detail hereinafter.

In certain installations, such as the table saw installation previously mentioned, once the motor has been stopped by plugging, it is desirable that the power connections be more positively disrupted than in the cases previously described. In general, in the cases previously described, the windings are disconnected from the line solely by the action of the rotation sensing switch and if a saw driven by such motor should accidentally or intentionally be rotated forwardly after having been stopped, the rotation sensing switch would close and the motor might tend to start in reverse with sufficient force to be dangerous. To eliminate this hazard the control switch 141 in the present instance is also provided with an intermediate off contact 148 to which the pole 142 is moved after the motor has been stopped by plugging. As an added precaution, a spring 149 is provided for automatically moving the pole 142 from the stop contact to the off contact as soon as the switch 141 is released by an operator. Thus, for plugged stopping, in this case, the switch 141 must be held in stop position.

The connections used for plugging the instant dual voltage motor are effected by a potential relay 151 having its coil connected between the motor terminal 129 and the stop contact 146 by a conductor 152. The relay 151 has a normally open contactor 153 interposed in series in a conductor 150 that is connected between the contact 146 of the control switch and the motor terminal 132. The relay 151 also has a normally closed contactor 154 connected in series with the coil of the relay 136. Upon energization, the relay 151 actuates its contactors in unison, opening the contactor 154 and closing the contactor 153. Opening of the contactor 154 deenergizes the relay 136 and causes the contactor 137 to close and reconnect the capacitor 133 in circuit. Closing of the contactor 153 connects the terminal 132 to the contact 146, and hence to the lead 143, thereby connecting the winding 128 directly across the line, and closing of the contactor 137 also puts the winding 126 across the line in series with the capacitor 133 to provide the negative torque for decelerating the motor, just as in the previously described cases.

It should be noted that the negative torque provided when the motor is connected for 220 volt operation is substantially greater than when the motor is connected for 110 volt operation. In the case of 110 volt operation, the winding 127 is also connected in series with the capacitor 133. This results, in the normally designed motor, in a turn ratio that is less than optimum for developing the maximum reversing torque. I have found, however, that this is ample torque to bring a saw blade or the like to rest very rapidly. In the case of 220 volt operation only the winding 126 is connected in series with the capacitor 133, the winding 127 being connected in series with the winding 128 directly across the line. The windings 127 and 128 are displaced in space about 90°, so that the net effect is that they are displaced by an angle other than the normal 90 electrical degrees. This yields a much stronger plugging torque than that provided by the 110 volt connection discussed above.

As in the previously described forms, the Fig. 7 form of the invention depends on a rotation sensing switch 156 to effect the disconnection of the motor when it has been stopped. The switch 156 is connected in series with the coil of the relay 151 in the conductor 152 and is closed when the motor is turning in the direction it is connected to run. When the motor starts to turn in the opposite direction, the switch 156 opens and deenergizes the relay 151. Upon deenergization, the relay 151 opens its contactor 153 and disconnects the windings from across the line.

Except for the difference in the operation of the windings as heretofore noted, the remaining circuit components operate in the same way when the motor is connected for either 110 or 220 volt operation. To start and operate the motor in both instances, the switch 141 is thrown so that the pole 142 engages the contact 144. This connects the windings 126 and 127 directly across the line, either in series or in parallel with one another as heretofore outlined. Also, the contactor 137 of the relay 136 being initially closed, the winding 128 is connected across the winding 126 in series with the capacitor 133 to provide a torque for starting the motor forwardly. Rotation of the motor forwardly closes the rotation sensing switch 156 and as the motor comes up to speed, energization of the relay 136 increases and when the motor attains running speed, the relay 136 opens its contactor 137. This action disconnects the winding 128 and the capacitor 133.

In the event it is desired to stop the motor quickly, the switch 141 is thrown and held so that its pole 142 engages the contact 146. Since the rotation sensing switch 156 is closed, the relay 151 is instantly energized and opens its contactor 154 and closes its contactor 153. The opening of the contactor 154 deenergizes the relay 136 causing it to close its contactor 137. The closing of the contactor 153 connects the windings and the capacitor across the line, as heretofore described, to provide the negative torque for decelerating the motor. As soon as the motor stops and begins to turn in the opposite direction the switch 156 instantly opens and deenergizes the relay 151 which in turn opens its contactor 153 and disconnects the windings. Thereafter the switch 141 may be released and it will, by reason of the spring 149 move to the off position. Of course, in the event plugged stopping is unnecessary, the motor may be stopped in the usual manner by simply throwing the switch directly to the off position, and allowing the motor to coast to a stop.

Thus, it is seen that the present invention provides an extremely simple and inexpensive arrangement for effecting plugged stopping of a single phase motor. The invention is applicable to a motor which is arranged for either uni-directional operation or instantly reversible operation. It is also applicable to a dual voltage single phase motor and to larger motors in which very heavy current flow is experienced. Moreover, the present invention provides a novel solution to the problem of plugging a single phase motor that has a conventional device for disconnecting the starting winding.

Although the invention has been described in connection with certain specific structural embodiments thereof, it is to be understood that other modifications and structural changes can be resorted to without departing from the scope of the invention as defined in the appended claims.

I claim:

1. In a single phase induction motor, the combination of a pair of axially displaced windings, a phase splitter, manual control switch means adapted to connect said windings across a line, said control switch means having running and stop positions, means interconnecting said control switch means, said windings, and said phase splitter to provide a torque for starting and operating said motor in one direction upon said control switch means being moved to said running position, means for disconnecting said phase splitter and one of said windings when the motor attains running speed, and means interconnecting said control switch means, said windings and said phase splitter to provide a negative torque for decelerating the motor upon said control switch means being moved from said running position to said stop position, said last-named interconnecting means including means for instantly reconnecting said phase splitter and said one winding in response to said movement of said control switch means, and means responsive to the direction of rotation of said motor for automatically instantly disconnecting said windings from across the line upon rotation of the motor in the reverse direction with said control switch means in said stop position.

2. The combination according to claim 1 in which said last-named interconnecting means comprises switch elements connected to form a shunt around said disconnecting means, said switch elements operating to complete said shunt upon movement of said control switch means from said run position to said stop position.

3. The combination according to claim 1 in which said control switch means comprises one pole and contacts engaged thereby of a manual multiple pole double throw switch and said last-named interconnecting means includes another pole and a contact engaged thereby of said manual switch, said other pole and said contact engaged thereby being connected to form a shunt around said disconnecting means when the switch is in stop position.

4. The combination according to claim 1 in which said last-named interconnecting means comprises relay means, said relay means being connected relative to said control switch means to be energized when said control switch means is in one of said positions and to be deenergized when said control means is in the other of said positions.

5. The combination according to claim 1 in which said last-named interconnecting means comprises a relay having an energizing coil, a contactor, and a contact engageable thereby, said contactor and said contact being connected to form a shunt around said disconnecting means and said coil being connected with respect to said control switch means to effect engagement of said contactor with said contact upon movement of said control switch means from said run position to said stop position.

6. In a single phase induction motor, the combination of a pair of axially displaced windings, a phase splitter, manual control switch means adapted to connect said windings across a line, said control switch means having running and stop positions, means interconnecting said control switch means, said windings, and said phase splitter to provide a torque for starting and operating said motor in one direction upon said control switch means being moved to said running position, a speed responsive switch connected in series with said phase splitter and said windings, said speed responsive switch disconnecting one of said windings and said phase splitter when the motor attains running speed, means including a shunt around said speed responsive switch for interconnecting said windings and said phase splitter to provide a negative torque for decelerating said motor upon said control switch means being moved to said stop position, and means responsive to the direction of rotation of said motor for automatically instantly disconnecting said windings from the line upon rotation of the motor in the reverse direction with said control switch means in said stop position.

7. The combination according to claim 1 in which said means for automatically instantly disconnecting said windings comprises a rotation sensing switch responsive to the direction of the motor and connected to be in series with said windings and said phase splitter when said control switch means is in said stop position, said rotation sensing switch instantly opening upon rotation of the motor in the reverse direction.

8. The combination according to claim 1 in which said last-named interconnecting means comprises a relay connected in series with said control switch means and in parallel with at least one of said windings when said switch means is in said stop position, and in which said means for automatically disconnecting said windings comprises a rotation sensing switch connected in series with said relay, said rotation sensing switch instantly opening upon rotation of the motor in the reverse direction, and said relay having a normally open contactor connected in series between said control switch means and said windings when said control switch means is in said stop position.

9. In a single phase induction motor, the combination of a pair of axially displaced windings, a phase splitter, manual control switch means adapted to connect said windings across a line, said control switch means having a running position and a stop position, means interconnecting said control switch means, said windings, and said phase splitter to provide a torque for starting and operating said motor in one direction upon said control switch means being moved to said running position, a relay connected to be responsive to the rotative speed of said motor and having a contactor connected in series with said phase splitter, said relay being operative to open said contactor for disconnecting said phase splitter and one of said windings upon the motor attaining running speed, means responsive to the movement of said control switch means to stop position for effecting closure of said contactor, means interconnecting said control switch means, said windings, and said phase splitter to provide a negative torque for decelerating the motor upon said control switch means being moved to said stop position and said contactor being closed, and means responsive to the direction of rotation of said motor for automatically instantly disconnecting said windings from the line upon rotation of the motor in the reverse direction with said control switch means in said stop position.

10. In a single phase induction motor, the combination of a pair of axially displaced primary windings connected to a lead adapted to be connected to one side of a line, a phase splitter connected between said windings, a double pole double throw control switch having running and stop positions and having one pole thereof adapted to be connected to the other side of the line, a pair of run and stop contacts engageable by said one pole in run and stop positions of said control switch, means providing a connection between said run contact and one of said windings for connecting said one winding across the line when said one pole is closed on said run contact and for simultaneously connecting said phase splitter and the other winding in parallel circuit therewith, means including a disconnecting switch in series with said phase splitter for disconnecting said phase splitter and said other winding when the motor attains running speed, a rotation sensing switch movable in response to a change in direction of rotation of the motor and connected to said stop contact, a pair of interconnected shunt contacts, one of which is engageable by the other pole of said control switch when the latter is in stop position, means providing a connection from said one shunt contact to said other winding at one side of said disconnecting switch for connecting said other winding across the line when said control switch is in stop position, and means providing a connection from said other pole of said control switch to the opposite side of said disconnecting switch whereby to connect said phase splitter and said one winding across the line in parallel circuit with said other winding and in shunt relation around said switch when said control switch is in stop position thereby effecting deceleration of the motor under negative torque, said rotation sensing switch being instantly movable upon reversal of the motor for disrupting the connections between the other side of the line and said windings whereby to deenergize and effect plugged stopping of the motor.

11. In a single phase motor, the combination of a pair of axially displaced primary windings one end of each being connected to a common lead adapted to be connected to one side of a line, a phase splitter connected between the other ends of said windings opposite said common lead, manual control switch means having a pair of spaced contacts and a pole movable therebetween and adapted to be connected to the other side of the line, conductor means interconnecting one of said contacts and the said other end of one of said windings for starting the motor in one direction upon said pole engaging said one contact, means including a disconnecting switch in series with said phase splitter for disconnecting the same when the motor attains running speed, conductor means including a contactor interconnecting said other contact and said other end of the other of said windings, a relay connected in parallel with said windings for closing said contactor when said pole engages said other contact, means operable by said relay to provide a shunt around said disconnecting switch upon said pole engaging said other contact, and a rotation sensing switch connected in series with said relay, said rotation sensing switch being movable in response to a change in direction of rotation of the motor and instantly causing said relay to open said contactor and deenergizing said windings upon reversal of the motor whereby to effect plugged stopping of the same.

12. The combination according to claim 11 in which said shunt providing means includes a second normally open contactor operable by said relay in unison with the contactor first mentioned.

13. In a single phase motor, the combination of a pair of axially displaced primary windings one end of each being connected to a lead adapted to be connected to one side of a line, a phase splitter connected between the other ends of said windings opposite said lead, manual control switch means having a pair of spaced contacts and a pole movable therebetween and adapted to be connected to the other side of the line, conductor means interconnecting one of said contacts and the said other end of one of said windings for starting and operating said motor in one direction when said pole engages said one contact, disconnecting means including a disconnecting switch in series with said phase splitter for disconnecting the same when the motor attains running speed, conductor means interconnecting the other of said contacts and said other end of the other of said windings for decelerating the motor, a relay connected in said first-mentioned conductor means and having a normally closed contactor connected in shunt relation around said disconnecting switch, said relay holding said contactor open when said pole engages said one contact and closing the same when said pole is disengaged therefrom, and a rotation sensing switch movable in response to a change in the direction of rotation of the motor and connected in series in the last-mentioned conductor means and deenergizing said windings upon a reversal of the motor whereby to effect plugged stopping of the same.

14. In a single phase reversible motor, the combination of a pair of axially displaced primary windings, one end of each winding being connected to a lead adapted to be connected to one side of a line, a phase splitter connected between the other ends of said windings opposite said lead, manual reversing and control switch means having a pole adapted to be connected to the other side of the line and three spaced contacts engageable thereby, means interconnecting one of said contacts and said other end of one of said windings for starting and operating said motor in one direction, means interconnecting the second of said contacts and said other end of the other of said windings for starting and operating said motor in the opposite direction, a speed responsive switch in series with said phase splitter for disconnecting the same and also the winding functioning as a starting winding when the motor attains running speed in either direction, and means including a rotation sensing switch interconnecting the third of said contacts and said other end of the other of said windings and establishing a shunt around said speed responsive switch upon said pole being moved from said first contact to said second contact for decelerating the motor under negative torque, said rotation sensing switch being movable in response to a change in the direction of rotation of the motor from said one direction to the said other direction for instantly deenergizing said windings whereby to provide plugged stopping of the motor from operation in said one direction.

15. In a single phase reversible motor, the combination of a pair of axially displaced primary windings, one end of each being connected to a lead adapted to be connected to one side of a line, a phase splitter connected between the other ends of said windings opposite said lead, manual control switch means having a pole adapted to be connected to the other side of the line, said control switch means having a first contact engageable by said pole and connected to said other end of one of said windings for operating the motor in one direction and a second contact engageable by said pole and connected to said other end of the other of said windings for operating the motor in the other direction, a speed responsive switch connected between said phase splitter and said other winding for disconnecting the phase splitter and also the winding functioning as a starting winding when the motor attains running speed in either direction, a double throw rotation sensing switch having a movable contactor connected to said other end of the other of said windings and a pair of spaced contact elements, said contactor being movable to instantly engage one contact element upon rotation of the motor in one direction and to instantly engage the other of said contact elements upon rotation of the motor in said other direction, conductor means adapted to interconnect said one contact element and said phase splitter around said speed responsive switch when said pole engages said second contact and to interconnect said other contact element and said phase splitter around said speed responsive switch when said pole engages said one contact whereby said motor is instantly reversible from either direction, and conductor means including a third contact engageable by said pole for interconnecting said phase splitter around said speed responsive switch whereby to provide plugged stopping of the motor from operation in said one direction.

16. In a single phase motor, a pair of axially displaced primary windings one end of each being connected to a lead adapted to be connected to one side of a line, a phase splitter connected between the other ends of said windings opposite their connections with said lead, manual control switch means having a pair of spaced contacts and a pole movable therebetween, said pole being adapted to be connected to the other side of the line, means interconnecting one of said contacts and said other end of one of said windings for starting and operating said motor in one direction, first relay means connected to be responsive to the rotative speed of the motor and having a normally closed contactor in series with said phase splitter for disconnecting said phase splitter and the other of said windings upon the motor reaching a predetermined rotative speed, means including a normally open contactor adapted when closed to interconnect the other of said contacts and said other end of the other of said windings, second relay means connected between said other contact and said lead for closing said normally open contactor upon engagement of said pole with said other contact, means for deenergizing said first relay means and thus reconnecting said phase splitter when said pole engages said other contact thereby decelerating the motor under a negative torque, and a rotation sensing switch in series with said second relay means for automatically deenergizing the same and instantly effecting disconnection of the windings upon reversal of the motor.

17. The combination according to claim 16 in which said means for deenergizing said first relay means comprises a normally closed contactor actuated by said second relay means and connected in series with said first relay means and adapted to be open upon energization of said second relay means when said pole engages said other contact.

18. The combination according to claim 16 in which said motor is a dual voltage motor having three primary windings, two of said windings being connectable in parallel for low voltage operation and connectable in series for high voltage operation.

References Cited in the file of this patent

UNITED STATES PATENTS 2,488,383   Renault _____ Nov. 15, 1945